(12) United States Patent
Strickland

(10) Patent No.: US 6,511,216 B2
(45) Date of Patent: Jan. 28, 2003

(54) INTERIOR-MOUNTED EMERGENCY VEHICLE SIGNAL DEVICE

(76) Inventor: George H. Strickland, 43 Tucker Ridge Ct., Hilton Head Island, SC (US) 29926-2770

( * ) Notice: Subject to any disclaimer, the term of this patent is extended or adjusted under 35 U.S.C. 154(b) by 0 days.

(21) Appl. No.: 09/784,896

(22) Filed: Feb. 15, 2001

(65) Prior Publication Data

US 2002/0109999 A1 Aug. 15, 2002

(51) Int. Cl.⁷ .................................................. B60Q 1/26
(52) U.S. Cl. ........................ 362/542; 362/490; 362/503; 362/543
(58) Field of Search ............................. 362/503, 504, 362/540, 541, 542, 543, 544, 545, 488, 490

(56) References Cited

U.S. PATENT DOCUMENTS

| | | | | |
|---|---|---|---|---|
| 2,017,798 A | * | 10/1935 | Gillespie | 362/503 |
| 3,665,392 A | * | 5/1972 | Annas | 362/503 |
| 4,189,709 A | | 2/1980 | Gosswiller | 362/219 |
| 4,543,622 A | | 9/1985 | Menke et al. | 362/219 |
| 4,682,146 A | | 7/1987 | Friedman III | |
| 4,758,931 A | | 7/1988 | Gabaldon | |
| 4,981,363 A | * | 1/1991 | Lipman | 362/503 |
| 5,099,401 A | | 3/1992 | Kondo et al. | |
| 5,186,533 A | | 2/1993 | Hori | |
| 5,444,620 A | | 8/1995 | Yeh | 340/464 |
| 5,663,707 A | | 9/1997 | Bartilucci | 340/464 |
| 5,988,839 A | | 11/1999 | Pokorney et al. | 362/493 |
| 6,092,916 A | * | 7/2000 | Davis et al. | 362/490 |

* cited by examiner

Primary Examiner—Stephen Husar
(74) Attorney, Agent, or Firm—Michael A. Mann; William Y. Klett, III; Nexsen Pruet Jacobs & Pollard, LLC

(57) ABSTRACT

An emergency vehicle signal device mounted in the interior of a vehicle which, when activated, is visible outside the vehicle, but which is not readily apparent outside the vehicle when not in operation. The signal device does not interfere with the operation of the vehicle when activated, and does not affect the aerodynamics, handling, or overhead clearance of the vehicle.

16 Claims, 3 Drawing Sheets

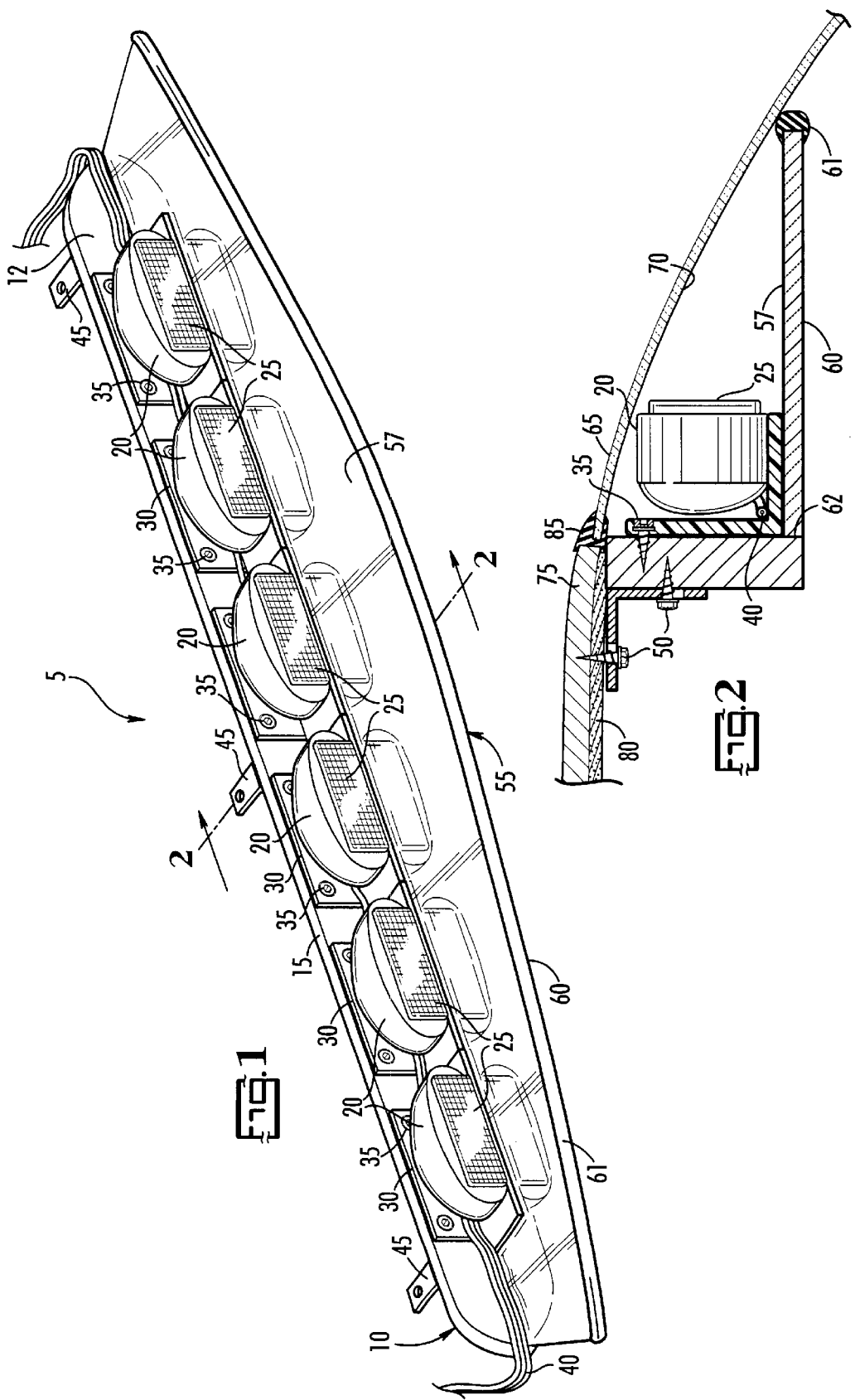

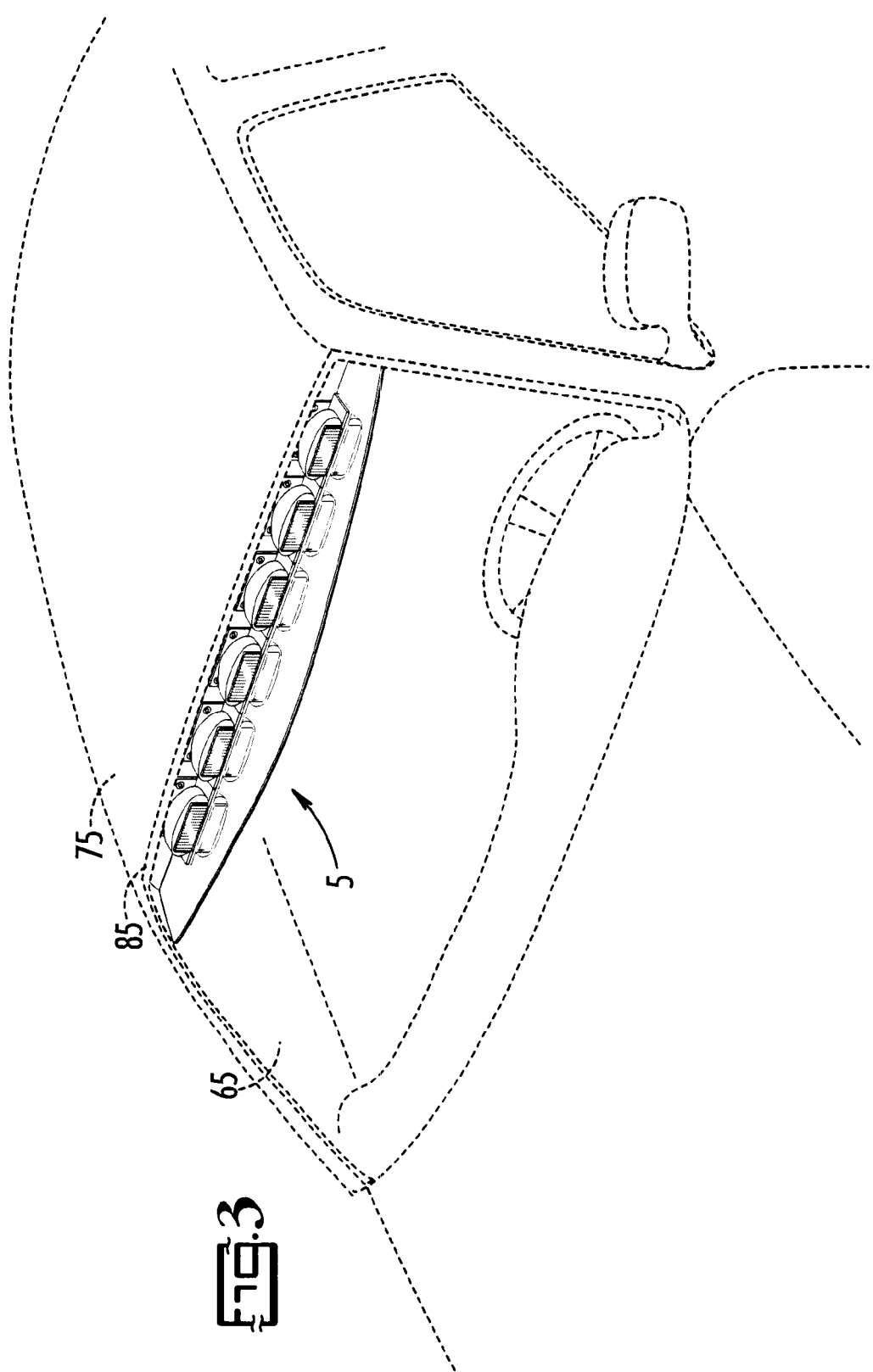

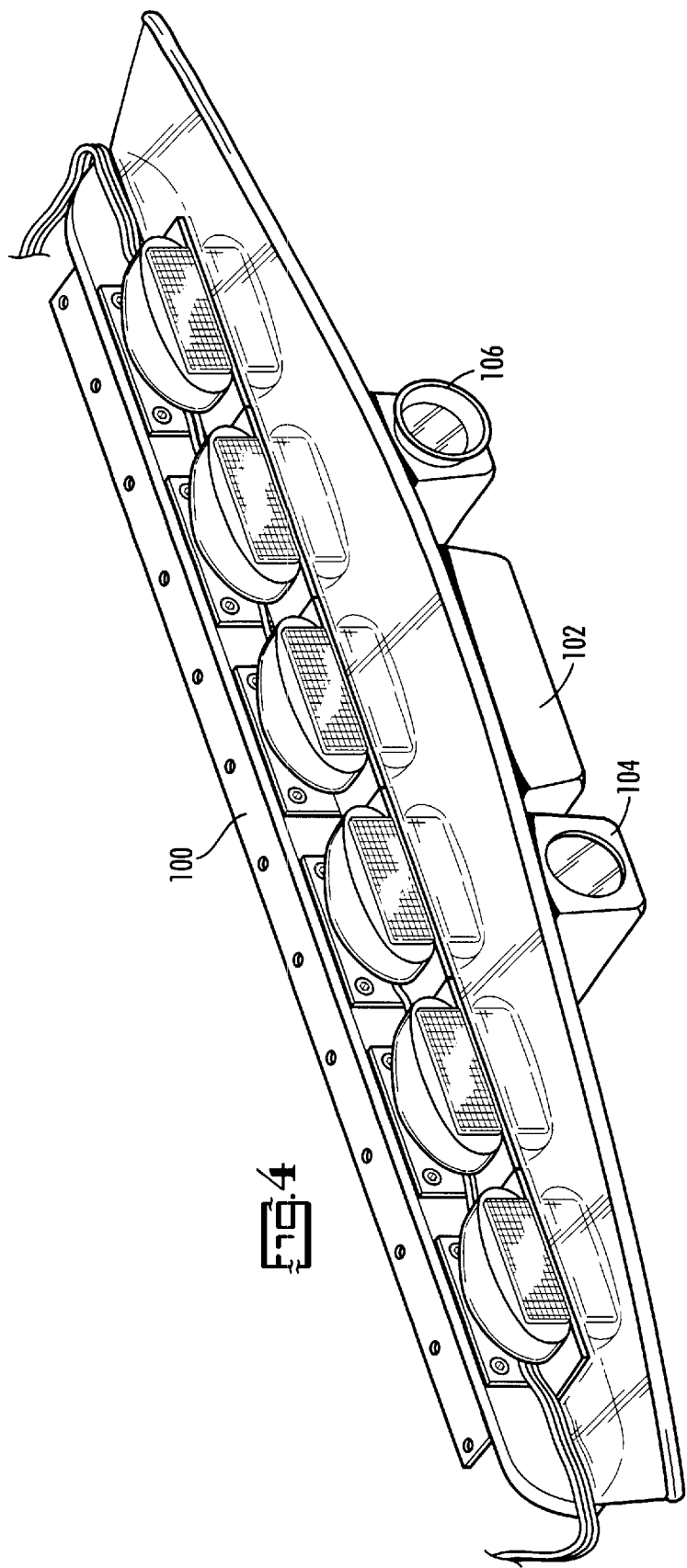

INTERIOR-MOUNTED EMERGENCY VEHICLE SIGNAL DEVICE

FIELD OF THE INVENTION

The present invention relates generally to an emergency vehicle signal device for use in warning the public of the presence of an emergency vehicle in traffic and otherwise and, more particularly, improvements in and to warning light systems for use on emergency vehicles. Specifically, this invention is directed to an emergency vehicle signal device which is mounted in the interior of an emergency vehicle which, when activated, is visible outside the vehicle, but which is not readily apparent outside the vehicle when not activated, and further does not interfere with operation of the vehicle when the device is activated. Accordingly, the general objects of the present invention are to provide novel and improved methods and apparatus of such character.

BACKGROUND OF THE INVENTION

The use of emergency vehicle signal devices for increasing the visibility of public service vehicles is well known in the art. Vehicles using such devices include emergency, police, municipal, and construction vehicles, among others. The most widely employed type of visual warning system is the roof-mounted light bar. Such a light bar includes a plurality of light generators arranged on a support which spans from side-to-side, and either rests upon or is spaced above, the roof of the emergency vehicle, as set forth in the disclosures of U.S. Pat. Nos. 4,620,268 and 5,027,260. While such light bars accomplish the purpose of producing a wide variety of highly visible light radiation patterns to warn the public of the presence of the vehicle on which they are employed, prior art light bars possess certain inherent disadvantages. First, such prior light bars increase vehicle wind resistance and, correspondingly, increase fuel consumption due to the placement of the light bar on the roof of the emergency vehicle. Such placement interferes with the aerodynamic design of the vehicle. Further, at higher rates of speed, turbulence is created by a conventional light bar, thereby increasing the ambient noise level within the vehicle and having a negative effect on communications. Such turbulence also adversely affects the handling characteristics of the vehicle. A traditional light bar also increases vehicle height which may limit access to certain areas, or present the possibility of damage to property or the light bar itself where there is limited overhead clearance. Additionally, particularly in the context of law enforcement vehicles, the presence of a light bar conspicuously identifies the nature of the vehicle. Prior art light bars have been traditionally mounted on the roof of an emergency vehicle. Such a mounting configuration, however, requires that the exterior of the emergency vehicle be breached or defaced through the drilling of holes for purposes of fastening and wiring the light bar. When such roof-mounted light bars are removed from an emergency vehicle, such fastening or wiring holes require repair (i.e., patching and repainting) or reduce the value of the vehicle upon resale.

In an attempt to overcome the inherent disadvantages of roof-mounted light bars, alternative configurations have been accomplished through various combinations of grill or bumper-mounted warning lights, headlight flashers, warning lights mounted inside the vehicle on the dashboard, sun visors or rear vision mirror, and warning lights integrated with the externally-mounted rear view mirrors, such as disclosed in U.S. Pat. No. 5,660,457. These configurations hold some disadvantage, however, because such lights are located relatively close to the ground, and do not provide as effective a warning to the public as that afforded by conventional roof-mounted light bars. Further, with respect to warning lights placed inside the vehicle, vision at night has been problematic, due to refraction of the light into the interior of the vehicle, thereby interfering with the visibility of the operator. Another attempt at solving the disadvantages of roof-mounted light bar is set forth in U.S. Pat. No. 5,988,839, wherein an exterior, rear-facing light bar is described. The light bar of U.S. Pat. No. 5,988,839, however, is permanently affixed on the rear exterior of the vehicle, does not display a warning light to the front of the vehicle, and is not entirely inconspicuous when not in operation.

It may be appreciated that there is a continuing need for a new and improved emergency vehicle signal light visible from the front and/or rear of the emergency vehicle that possesses all of the advantages of prior art light bars without the disadvantages discussed above. None of the existing patented inventions nor known prior uses, whether taken singularly or in combination, disclose the specific details of the present invention in such a way as to bear upon the claims of the present invention to be disclosed herein.

SUMMARY OF THE INVENTION

In view of the foregoing disadvantages inherent in the known types of emergency vehicle signal devices now present in the prior art, the present invention provides an improved signal light mounted in the interior of an emergency vehicle. The general purpose of the present invention, which will be described subsequently in greater detail, is to provide an emergency vehicle signal device that is visible through a front and/or rear window of a vehicle which, through mounting in the interior of the emergency vehicle, has all of the advantages of the prior art and none of the disadvantages.

The signal device of the present invention comprises an internally-mounted light bar having a single tier array of individually-controllable, light generators which may be energized to create any desired illumination pattern. The light bar is mounted along the interior top edge of the front and/or rear windshield of the emergency vehicle. The light bar is mounted within a housing assembly which attaches along one edge to the headliner or interior roof of the vehicle with the opposing edge of the housing extending to and along the contour of the windshield glass. The housing operates to shield the interior of the vehicle from refraction of the signaling device when energized, and provides a finished appearance when viewed from the interior of the vehicle. The housing may also be fitted with various storage compartments and/or other equipment (e.g., radar devices, cameras) for use by operators of the vehicle. Use of the housing for this additional purpose reduces the possibility of such equipment being placed on the dashboard of the vehicle and becoming projectiles during high-speed operation or collision, and increases visibility for the operator of the vehicle.

In the typical installation, the emergency signal device in accordance with the present invention will be mounted entirely within the interior of the vehicle through the use of a housing fastened to the headliner of the vehicle extending to the front and/or rear windshields. When installed, the emergency vehicle signal device will not be visible from the exterior of the vehicle, will not adversely affect the aerodynamics of the vehicle, will not decrease the visibility of occupants inside the vehicle, yet when energized, will possess all of the advantages of a roof-mounted light bar without refraction of the light into the interior of the emergency vehicle, particularly at night.

According to a further aspect of the invention, the present invention may be easily installed in existing emergency vehicles, or may be installed during manufacture of such a vehicle. The signal device of the present invention can also be easily removed upon resale of the emergency vehicle or for the purpose of installing varying light configurations (e.g., lenses of red, blue, amber, etc.).

BRIEF DESCRIPTION OF THE DRAWINGS

FIG. 1 is a perspective view of the emergency vehicle signal device;

FIG. 2 is a cross-sectional view along line 2—2 showing placement of the signaling device in the interior of an emergency vehicle at the intersection of the roof of the vehicle and the front or rear windshield;

FIG. 3 is a perspective view of the emergency vehicle signaling device installed in the front interior of an emergency vehicle; and FIG. 4 is a perspective view of an alternative embodiment of the emergency signaling device installed in the front interior of an emergency vehicle.

DETAILED DESCRIPTION OF THE PREFERRED EMBODIMENTS

Referring specifically to the drawings, the interior-mounted emergency vehicle signal device will be disclosed.

The present invention is suited for use with any vehicle having an interior (i.e., a car or truck rather than motorcycle). FIG. 1 shows the signal device comprising a housing (5) having a vertical planar member (10), said vertical planar member (10) having a front face (12), a back face (14), and a top edge (15). Said housing (5) is further comprised of a horizontal planar member (55) having a leading edge (60), a trailing edge (62), a top surface (57), and a bottom surface (58), said leading edge (60) having attached thereto a gripping means (61), such as a rubber bumper or a plurality of rubber cylinders. Vertical planar member (10) is attached to trailing edge (62) of horizontal planar member (55) along the front face (12) opposite top edge (15), forming a 90° angle between vertical planar member (10) and horizontal planar member (55), thereby forming a generally L-shaped shelf. A single tier of a plurality of light generators (20) having base members (30) well-known in the art are attached at base members (30) to the front face (12) of vertical planar member (10) of housing (5) using fastening means (35). The plurality of light generators (20) is electrically connected to the power supply of the vehicle by wires (40) and circuitry (not shown) which are well-known and understood by those skilled in the art. A plurality of attachment means (45) extend from back face (14) of vertical planar member (10) along top edge (15). Attachment means (45) may be common L-shaped brackets well-known in the art. In an alternative embodiment of the signal device, attachment means (45) may also include an integral mounting flange (100) extending along top edge (15) and protruding therefrom at a 90° angle, as depicted in FIG. 4.

FIG. 2 is a cross-sectional view illustrating the means by which the present signal device is attached to the interior of a vehicle having a roof (75), headliner (80), and windshield (65) having an interior surface (70). Said roof (75) abuts windshield (65) at joint (85) which is comprised most commonly of a rubber sealing means well-known in the automotive industry. Housing (5) of the present invention is mounted to the interior of a vehicle through use of fastening means (50) which fasten attachment means (45) to headliner (80). Housing (5) is preferably placed to maximize exterior illumination by light generators (20) so that front face (12) of vertical planar member (10) is vertically aligned with joint (85). Such placement of housing (5) allows horizontal planar member (55) to extend to windshield (65) so that leading edge (60) abuts interior surface (70) at gripping means (61), thereby shielding the interior of the vehicle from refracted light emitted from light generators (20) during operation. Gripping means (61) acts to prevent movement between windshield (65) and horizontal planar member (55). Top surface (57) of horizontal planar member (55) may preferably be coated with any number of reflective materials well-known in the art.

FIG. 3 illustrates placement of the present invention as viewed through the front windshield of a vehicle. The present invention is mounted entirely within the interior of a vehicle.

Alternative embodiments of the present signal device invention include any number of lens colors or illumination patterns for light generators (20). A further embodiment of the signal device, as shown in FIG. 4, includes the attachment of a storage compartment (102) and equipment such as a radar device (104) and a camera (106) to bottom surface (58) of horizontal planar member (55) of housing (5).

Although various preferred embodiments of the present invention have been described herein in detail, it will be appreciated by those skilled in the art that variations may be made thereto without departing from the spirit of the invention or the scope of the appended claims.

What is claimed is:

1. A device for use as an emergency signal in a vehicle having an interior roof and a windshield, comprising;
   a housing,
   a plurality of light generators attached to said housing,
   means for internally mounting said housing to said interior roof and against the interior surface of the windshield of said vehicle.

2. The device of claim 1, wherein the housing comprises a horizontal planar member having a leading edge and a trailing edge, said leading edge having a gripping means, and a vertical planar member having a top edge, front face, and rear face, said horizontal planar member attached perpendicular to said vertical planar member at a joint formed by the trailing edge of the horizontal planar member and the front face of the vertical planar member, generally forming an L-shaped shelf.

3. The device of claim 2, wherein the plurality of light generators are attached to the front face of the vertical planar member.

4. The device of claim 2, wherein said housing further comprises a mounting flange integral to the top edge of vertical planar member.

5. The device of claim 2, wherein said leading edge of said horizontal member conforms to the curvature of said windshield of said vehicle.

6. The device of claim 2, wherein said horizontal planar member further comprises a top surface and a bottom surface.

7. The device of claim 6, wherein said top surface is coated with a material reflective of light.

8. The device of claim 6 further comprising a radar device mounted on said bottom surface.

9. The device of claim 6 further comprising a camera mounted on said bottom surface.

10. The device of claim 6 further comprising a means for storage integrally connected to said bottom surface.

11. The device of claim 6 wherein the bottom surface of said horizontal planar member and the rear face of said vertical planar member are finished to match the interior of the vehicle.

12. The device of claim 3, wherein said plurality of light generators further comprise a colored lens.

13. A method of installing a device for use as an emergency signal in a vehicle having an interior roof and a windshield, said method comprising the steps of:

placing a device along the interior intersection of said windshield and an interior roof of a vehicle, wherein said device includes a housing and a plurality of light generators attached to said housing;

abutting said housing against the interior surface of said windshield; and attaching said housing to said interior roof of said vehicle.

14. The method as recited in claim 13, wherein said device is installed in the front of the interior of said vehicle.

15. The method as recited in claim 13, wherein said device is installed in the rear of the interior of said vehicle.

16. The method as recited in claim 13, wherein said device is installed in the front and the rear interior of said vehicle.

* * * * *

(12) EX PARTE REEXAMINATION CERTIFICATE (9242nd)
United States Patent
Strickland

(10) Number: US 6,511,216 C1
(45) Certificate Issued: Aug. 28, 2012

(54) INTERIOR-MOUNTED EMERGENCY VEHICLE SIGNAL DEVICE

(75) Inventor: George H. Strickland, Hilton Head Island, SC (US)

(73) Assignee: G H Strickland, LLC, Alpharetta, GA (US)

Reexamination Request:
No. 90/011,876, Aug. 25, 2011

Reexamination Certificate for:
Patent No.: 6,511,216
Issued: Jan. 28, 2003
Appl. No.: 09/784,896
Filed: Feb. 15, 2001

(51) Int. Cl.
*B60Q 1/26* (2006.01)

(52) U.S. Cl. .................. 362/542; 362/490; 362/503; 362/543

(58) Field of Classification Search .................. None
See application file for complete search history.

(56) References Cited

To view the complete listing of prior art documents cited during the proceeding for Reexamination Control Number 90/011,876, please refer to the USPTO's public Patent Application Information Retrieval (PAIR) system under the Display References tab.

*Primary Examiner* — Pia Tibbits

(57) ABSTRACT

An emergency vehicle signal device mounted in the interior of a vehicle which, when activated, is visible outside the vehicle, but which is not readily apparent outside the vehicle when not in operation. The signal device does not interfere with the operation of the vehicle when activated, and does not affect the aerodynamics, handling, or overhead clearance of the vehicle.

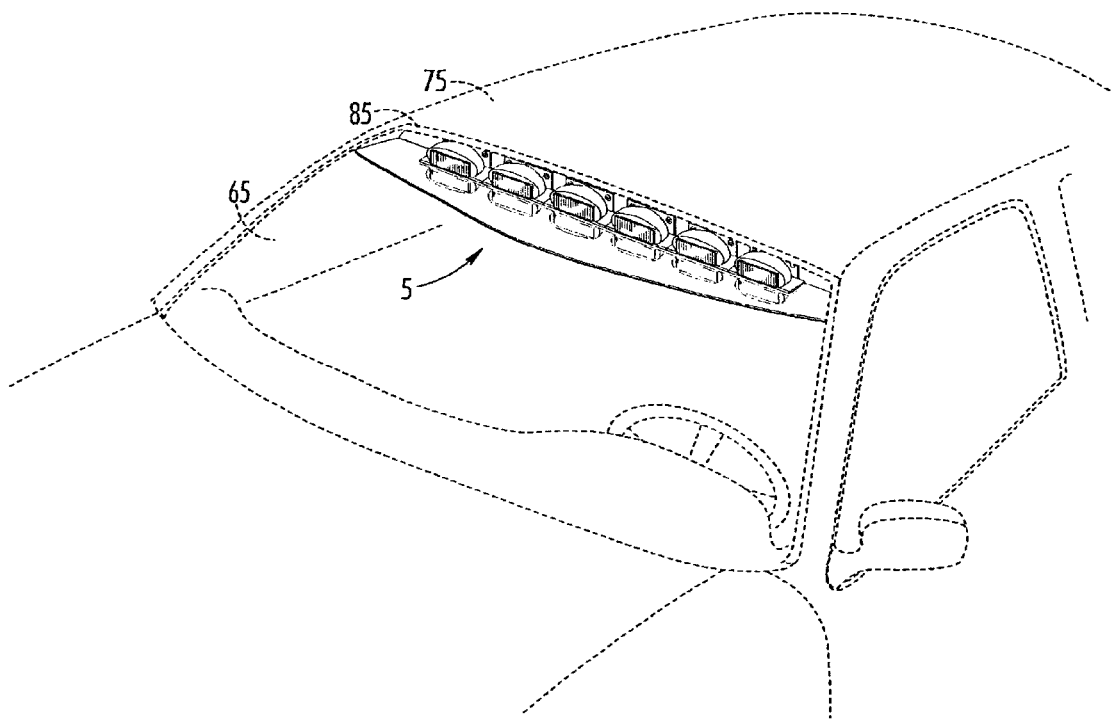

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

* * * * *